B. B. HILL.

HAND STAMP.

No. 10,740. Reissued June 29, 1886.

Witnesses

W. W. Hollingsworth

E. H. Bond.

Inventor

Benjamin B. Hill

By his Attorney J. J. W. Robertson

UNITED STATES PATENT OFFICE

BENJAMIN B. HILL, OF PHILADELPHIA, PENNSYLVANIA.

HAND-STAMP.

SPECIFICATION forming part of Reissued Letters Patent No. 10,740, dated June 29, 1886.

Original No. 315,286, dated April 7, 1885. Application for reissue filed January 9, 1886. Serial No. 188,108.

*To all whom it may concern:*

Be it known that I, BENJAMIN B. HILL, a citizen of the United States of America, residing at Philadelphia, in the county of Philadelphia and State of Pennsylvania, have invented certain new and useful Improvements in Hand-Stamps, of which the following is a specification, reference being had therein to the accompanying drawings.

This invention relates to that class of self-inking hand-stamps in which the die-plate reverses its position at every stroke so as to turn over face upward to take ink as it rises, and then turns its face down again to give the impression; and it consists in the peculiar construction, arrangement, and combinations of parts by which the reversal of the plate is accomplished, as hereinafter more particularly described and claimed.

Figure 1:
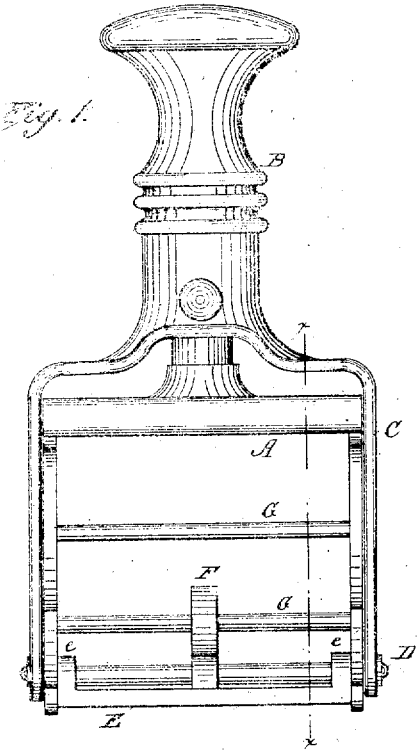
Figure 2:
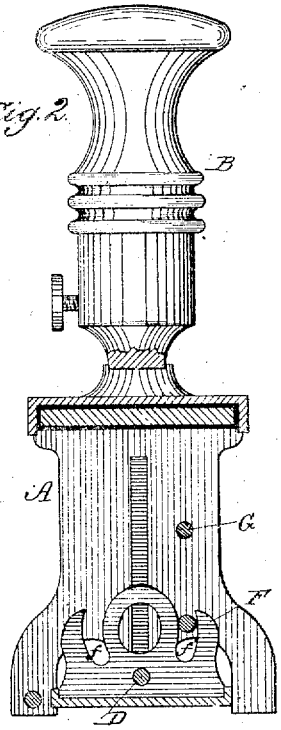
Figure 3:
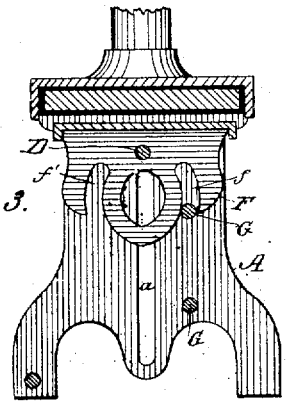

In the accompanying drawings, Figure 1 represents a front elevation of a stamp constructed according to my improvement when giving the impression; Fig. 2, a vertical cross-section of the same on the line *x x* on Fig. 1. Fig. 3 represents a similar section with the handle removed and the die-plate about to take ink; and Fig. 4 represents a section similar to the last with the die-plate in the act of turning.

A represents the main frame constructed in the usual manner, and B is the handle provided with the usual fork, C, whose lower ends embrace the journal D, which passes through the slots *a a* in the sides of the frame and through ears *e e* on the die-plate E.

At F is shown a cam-plate arranged across the center of the die-plate; but it may be on the one end, if preferred, or half on one end and half on the other; but I prefer the central position, as the die-plate is not only more evenly balanced, but the cam-plate forms a means of strengthening the die-plate, so that the latter may be made very thin. The cam-plate is made, as shown, with two guides or slots, *f f'*, the sides of which engage with a fixed reverser consisting of two pins, G, passing in this instance from side to side; but when the cam-plate is arranged at the end of the die-plate it is obvious that pins projecting from the side of the frame will be sufficient.

Figure 4:
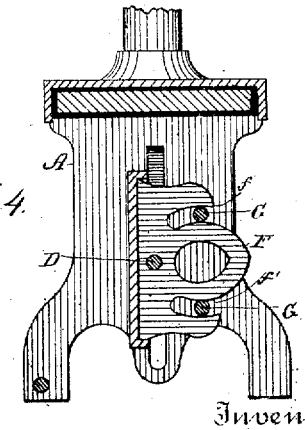

When not in operation, the die-plate is in the position shown in Fig. 3, with the upper pin G in the slot *f*, but as the handle is pressed down the die-plate descends, so that said upper pin G passes farther into the slot, and as it comes into contact with the curved part of the edge of the slot it begins to turn the die-plate until the latter turns so far as to cause the lower pin G to engage with the slot *f'*, as shown in Fig. 4, and as the die-plate continues to descend the slot *f* leaves the upper pin G, and the die-plate assumes the position shown in Fig. 2, and is ready to give the impression.

From the above and the drawings it will be seen that the sides of the slots are parallel, and that one or the other of the pins G G is always engaged with the slotted guides in the cam-plate, by which means all backlash is avoided, and the die-plate is held perfectly steady in all positions, which is owing mainly however to the parallel sides of the guides or slots.

It will be observed that by my invention the die-plate is not only reversed from a vertical to a horizontal position by the slotted guides, but it is held and guided in a horizontal position toward the paper or pad by said guides immediately after it has changed its position.

The arrangement of the cam-plate across the center of the die-plate has the advantage over those wherein the guide is at the end thereof in equalizing the friction at both ends, besides which the cam-plate forms a strengthening-rib across the center of the die-plate, so that it may be made much lighter and still have sufficient strength.

When the two pins G extend from side to side, as shown, there is no use for the brace or connection between the lower part of the legs on the right-hand side of the slot, because the pins G form a good brace, and thus the space between the sides or legs on that side of the stamp is left perfectly clear near the paper, and, if preferred, the brace H (shown on the other side) may be dispensed with also; but in this case the metal at the bottom of the slot should be slightly heavier.

I am aware that various devices have been employed for partially turning the die-plate by means of two notches in a plate attached to said die-plate operating in connection with two pins on the frame; but in all such cases with which I am acquainted the turning and guiding of the plate is completed by a separate device on the other end of said plate. In my stamp, however, the die-plate is completely reversed by the action of the two guides and the pins, so that the plate is not only reversed by the guide or cam-plate but is actually guided toward the paper or object to be stamped.

What I claim as new is—

1. The combination, with the die-plate of a self-inking stamp, of two slotted guides connected with said die-plate and two pins connected with the frame, one of said pins and guides being constructed to turn the plate from a vertical to a horizontal position as it descends toward the paper, and the other pin and guide to turn the plate to a horizontal position as it rises toward the ink-pad, substantially as described.

2. The combination, with the die-plate of a self-inking stamp, of two guides connected with said die-plate and two pins connected with the frame, one pin guiding the die-plate toward the ink-pad and the other guiding it toward the paper, its guide being extended so as to remain in contact with the pin to hold the die-plate while the impression is being given, substantially as described.

3. In a self-inking stamp having turning-pins G G, a die-plate provided with a central cam-plate, F, set transversely on the same, whereby said cam-plate performs the double funct on of a stay and a reversing device, substantially as described.

In testimony whereof I affix my signature in the presence of two witnesses.

BENJAMIN B. HILL.

Witnesses:
WILLIAM S. TOLAND,
T. J. W. ROBERTSON.